(12) United States Patent
Womack et al.

(10) Patent No.: US 8,408,853 B2
(45) Date of Patent: Apr. 2, 2013

(54) TRACK SYSTEM

(75) Inventors: Darren Womack, Windsor (CA);
William G. Bowes, Macomb Township, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 13/024,657

(22) Filed: Feb. 10, 2011

(65) Prior Publication Data

US 2011/0129315 A1 Jun. 2, 2011

Related U.S. Application Data

(63) Continuation of application No. 12/144,288, filed on Jun. 23, 2008, now Pat. No. 7,976,256, which is a continuation of application No. 11/249,478, filed on Oct. 14, 2005, now Pat. No. 7,390,154, which is a continuation of application No. 10/734,678, filed on Dec. 15, 2003, now Pat. No. 7,175,377, which is a continuation-in-part of application No. 10/336,033, filed on Jan. 3, 2003, now Pat. No. 6,827,531.

(51) Int. Cl.
*B60P 7/08* (2006.01)

(52) U.S. Cl. .................................. 410/105; 410/104

(58) Field of Classification Search ................ 410/12, 410/104, 105, 106, 110; 24/115 K, 265 CD; 244/118.1; 248/499, 503, 503.1
See application file for complete search history.

(56) References Cited

U.S. PATENT DOCUMENTS

| | | | |
|---|---|---|---|
| 2,110,435 A | 3/1938 | Albin |
| 2,602,691 A | 7/1952 | Doty |
| 2,685,848 A | 8/1954 | Meighan et al. |
| 2,688,289 A | 9/1954 | Sterling |
| 2,696,139 A | 12/1954 | Attwood |
| 2,736,272 A | 2/1956 | Elsner |
| 3,005,292 A | 10/1961 | Reiland |
| 3,053,355 A | 9/1962 | Attwood |
| 3,169,792 A | 2/1965 | Solano |

(Continued)

FOREIGN PATENT DOCUMENTS

| EP | 0 62 8 738 | 12/1994 |
| WO | WO-2004/094194 A1 | 11/2004 |

OTHER PUBLICATIONS

Article—Detroit Auto Show 2001—Toyota Matrix;http://203.139.122.131/motorshow/international/matrix/matrix_4.html; Mar. 14, 2001, 2 page.
Article—Ford Motor Company, "Mercury accessories", pp. 1-23.
Article—Hi-Lift.com web site; Oct. 16, 2001 (8 pgs.).

(Continued)

*Primary Examiner* — Stephen Gordon
(74) *Attorney, Agent, or Firm* — Foley & Lardner LLP (57) ABSTRACT

A fastener assembly secures loads to a track in a truck bed and is retainable within a track slot of the track. The fastener assembly may include a retainer adapted to fit at least partly within a track slot and a handle operating on the retainer, the handle being moveable between at least an engagement position and a release position. A pressure applicator is positioned between the track and the handle, the pressure applicator having a bottom surface for applying a pressure on a top surface of the track in response to the position of the handle. The pressure applicator includes at least one projection projecting from the bottom surface and adapted to engage a positioning cutout of the track.

17 Claims, 10 Drawing Sheets

U.S. PATENT DOCUMENTS

| | | |
|---|---|---|
| 3,241,501 A | 3/1966 | Welton |
| 3,478,995 A | 11/1969 | Lautzenhiser, et al. |
| 3,643,973 A | 2/1972 | Bott |
| 3,658,012 A | 4/1972 | Caringi |
| 3,722,910 A | 3/1973 | Heckenlaib |
| 3,802,138 A | 4/1974 | McCart |
| 3,831,976 A | 8/1974 | Iden, Sr. |
| 3,877,671 A | 4/1975 | Underwood et al. |
| 3,951,444 A | 4/1976 | Shull |
| 3,972,500 A | 8/1976 | Johnson et al. |
| 4,109,891 A | 8/1978 | Grendahl |
| 4,132,335 A | 1/1979 | Ingram |
| 4,168,668 A | 9/1979 | Grube et al. |
| 4,226,465 A | 10/1980 | McCullough |
| 4,239,139 A | 12/1980 | Bott |
| 4,248,558 A | 2/1981 | Lechner |
| 4,270,681 A | 6/1981 | Ingram |
| 4,278,376 A | 7/1981 | Hunter |
| 4,285,379 A | 8/1981 | Kowalski |
| 4,396,324 A | 8/1983 | Ellis |
| 4,410,298 A | 10/1983 | Kowalski |
| 4,449,875 A | 5/1984 | Brunelle |
| 4,469,261 A | 9/1984 | Stapleton et al. |
| 4,500,020 A | 2/1985 | Rasor |
| 4,545,697 A | 10/1985 | Verdenne et al. |
| 4,575,295 A | 3/1986 | Rebentisch |
| 4,630,982 A | 12/1986 | Fenner |
| 4,666,355 A | 5/1987 | Stover |
| 4,708,549 A | 11/1987 | Jensen |
| 4,717,298 A | 1/1988 | Bott |
| 4,739,528 A | 4/1988 | Allen |
| 4,741,582 A | 5/1988 | Peroni |
| 4,778,092 A | 10/1988 | Grace |
| 4,784,552 A | 11/1988 | Rebentisch |
| 4,796,837 A * | 1/1989 | Dowd |
| 4,827,742 A | 5/1989 | McDonald |
| 4,840,525 A | 6/1989 | Rebentisch |
| 4,850,063 A | 7/1989 | Abbate |
| 4,850,769 A | 7/1989 | Matthews |
| 4,887,947 A | 12/1989 | Bott |
| 4,911,348 A | 3/1990 | Rasor et al. |
| 4,915,342 A | 4/1990 | Nilsson |
| 4,941,702 A | 7/1990 | Southward |
| D310,017 S | 8/1990 | Matthews |
| 4,948,313 A | 8/1990 | Zankovich |
| 4,950,099 A | 8/1990 | Roellin |
| 4,955,771 A | 9/1990 | Bott |
| 4,961,553 A | 10/1990 | Todd |
| 4,969,784 A | 11/1990 | Yanke |
| 4,984,726 A | 1/1991 | Marshall |
| 5,044,856 A | 9/1991 | Jerabek |
| 5,137,403 A | 8/1992 | McCaffrey |
| 5,143,415 A | 9/1992 | Boudah |
| 5,154,385 A | 10/1992 | Lindberg et al. |
| 5,165,628 A | 11/1992 | Todd et al. |
| 5,188,479 A | 2/1993 | Nehls |
| 5,199,836 A | 4/1993 | Gogarty |
| 5,209,619 A | 5/1993 | Rinderer |
| 5,228,736 A | 7/1993 | Dutton |
| 5,259,711 A | 11/1993 | Beck |
| 5,271,586 A | 12/1993 | Schmidt |
| 5,297,888 A | 3/1994 | Nehls |
| 5,316,357 A | 5/1994 | Schroeder |
| 5,366,327 A | 11/1994 | Nelson |
| 5,370,488 A | 12/1994 | Sykes |
| 5,409,335 A | 4/1995 | Beck |
| 5,411,356 A | 5/1995 | Travis et al. |
| 5,433,550 A | 7/1995 | Huber |
| 5,433,566 A | 7/1995 | Bradley |
| 5,494,388 A | 2/1996 | Stevens |
| 5,533,848 A | 7/1996 | Davis |
| 5,560,666 A | 10/1996 | Vieira et al. |
| 5,628,598 A | 5/1997 | Hofle |
| 5,655,865 A | 8/1997 | Plank et al. |
| 5,674,033 A | 10/1997 | Ruegg |
| 5,676,508 A | 10/1997 | Weicht |
| 5,690,460 A | 11/1997 | Attanasio |
| 5,704,571 A | 1/1998 | Vargo |
| 5,765,978 A | 6/1998 | Looker et al. |
| 5,775,652 A | 7/1998 | Crawshaw et al. |
| 5,779,412 A | 7/1998 | Nagai et al. |
| 5,794,901 A | 8/1998 | Sigel |
| 5,820,322 A | 10/1998 | Hermann et al. |
| 5,823,724 A | 10/1998 | Lee |
| 5,823,727 A | 10/1998 | Lee |
| 5,827,023 A | 10/1998 | Stull |
| 5,893,538 A | 4/1999 | Onishi et al. |
| 5,915,900 A | 6/1999 | Boltz |
| 5,947,356 A | 9/1999 | Delong |
| 5,961,263 A | 10/1999 | Nunez |
| 5,975,822 A | 11/1999 | Ruff |
| 6,010,287 A | 1/2000 | Sommermeyer et al. |
| 6,017,071 A | 1/2000 | Morghen |
| 6,022,164 A | 2/2000 | Tsui et al. |
| 6,050,763 A | 4/2000 | Swailes |
| RE36,681 E | 5/2000 | Rinderer |
| 6,059,498 A | 5/2000 | Ostrowski |
| 6,086,300 A | 7/2000 | Frohlich |
| 6,113,328 A | 9/2000 | Claucherty |
| 6,196,777 B1 | 3/2001 | Price |
| 6,213,539 B1 | 4/2001 | Williams et al. |
| 6,238,153 B1 | 5/2001 | Karrer |
| 6,250,861 B1 | 6/2001 | Whitehead |
| 6,260,813 B1 | 7/2001 | Whitcomb |
| D446,442 S | 8/2001 | Simpson |
| 6,270,301 B1 | 8/2001 | Dunlop |
| 6,290,426 B1 | 9/2001 | Van Gijsel et al. |
| 6,334,750 B1 | 1/2002 | Hsieh |
| 6,336,766 B1 | 1/2002 | De Villele |
| 6,336,779 B1 | 1/2002 | Jakob et al. |
| 6,338,599 B1 | 1/2002 | Uno |
| 6,338,649 B1 | 1/2002 | Smith |
| 6,439,814 B1 | 8/2002 | Floe |
| 6,585,465 B1 | 7/2003 | Hammond et al. |
| 6,592,310 B2 | 7/2003 | Hyp et al. |
| 6,644,901 B2 | 11/2003 | Breckel |
| 6,827,531 B2 | 12/2004 | Womack et al. |
| 6,910,609 B2 | 6/2005 | Williams et al. |
| 7,175,377 B2 | 2/2007 | Womack et al. |
| 7,547,170 B2 | 6/2009 | Womack et al. |
| 2002/0048495 A1 | 4/2002 | Anderson et al. |
| 2002/0164225 A1 | 11/2002 | Snyder et al. |
| 2005/0036848 A1 | 2/2005 | Cunningham et al. |
| 2005/0145662 A1 | 7/2005 | Williams et al. |

OTHER PUBLICATIONS

Article—MaxRax "The Solution to Your Hauling Problem", http:www.truckracks.com/; Jul. 27, 2000, 1 page.

Article—Midland-Ross Corporation, "Goldguard—New standard in corrosion protection from Superstrut", Superstrut Division, Oakland, CA, 1 page.

Article—MIRAGE Truck Rack; "The Original Disappearing Rack"; U.S. Patent 5,143,415; Mirage truck rack accessories; http:www.altech.ab.ca/jembrack/mirage3.htm; Nov. 14, 2000, 2 pages.

Article—Saddlepack Storage Systems for Long Bed Trucks by Steel Horse, TruckStuft USA, http://www.truckstuffusa.com/ste58202.html; Jul. 27, 2000, 1 page.

Article—Superstrut, "Metal Framing Channel & Pipe Hangers—Typical Applications", pp. 1-4 (1984).

Article—Superstrut, "Superstruts Products From BCR, Inc., Building Specialties", pp. 1-4.

Article—Superstrut, "Total Support Systems", Superstrut Division—Illustrated Price List, pp. 1-41 (1986).

Article—SystemOne Modular Truck Equipment, Christensen Manufacturing, http:www.christensenmfg.com/html/features.html; Jul. 27, 2000, 2 pages.

Article—Toyota's 2001 Toyota Matrix—"Connect. toyota.com/matrix," Toyota Motor Sales, U.S.A., 4 pages.

Article—Toyota's 2001 Toyota Matrix—Truckworld Online!; http://www.truckworld.com/Sport-Utility/01-toyota-matrix/01-toyotamatrix.html; Mar. 7, 2001, 4 pages.

Article—TracRac, "Packing Check List", TracRac, Fall River, MA, 2 pages (1998).
Article—TracRac, "The Ultimate Sliding Truck Rack System", TracRac, Fall River, MA, 1 page.
Article—TracRac, "The Ultimate Van Rack", TracRac, Fall River, MA, 1 page.
Article—BCR, Inc, Building Specialties, Aickinstrut Structures and Fasteners, Aickinstrut, Inc., pp. A-D.
Article—B-Line Systems Inc., "Strut Systems", Engineering Catalog, pp. 1-176.
Article—Midland-Ross Corporation "Superstrut—The Complete Line. One Source.", Superstrut Division, Oakland, CA, 1 page.
Article—SystemOne Modular Truck Equipment, Christensen Manufacturing, http:www.christensenmfg.com/; Jul. 27, 2000, 1 page.
Article—Unistrut Los Angeles, "Unistrut framing systems for Maintenance Supervisors, Design Engineers, Plant Engineers", pp. 1-31.
Article—Unistrut, General Engineering Catalog, pp. 1-126.
Brochure—Hi-Lift® The Original Jacks, Bloomfield Manufacturing Co., Inc., 2001, cover page, pp. 6 and 7.
Dialog File 226; U.S. Trademark registrations 1,824,078; 1,613,372 and 828,807, "Slide-N-Lock".

* cited by examiner

TRACK SYSTEM

CORRESPONDING RELATED APPLICATIONS

The present application is a continuation of U.S. application Ser. No. 12/144,288 (now U.S. Pat. No. 7,976,256), filed Jun. 23, 2008, (now U.S. Pat. No. 7,976,256), which is a continuation of application Ser. No. 11/249,478, filed Oct. 14, 2005 (now U.S. Pat. No. 7,390,154), which is a continuation of application Ser. No. 10/734,678, filed Dec. 15, 2003 (now U.S. Pat. No. 7,175,377), which is incorporated by reference herein in its entirety, which is continuation in part of U.S. application Ser. No. 10/336,033 filed on Jan. 3, 2003 (now U.S. Pat. No. 6,827,531), which is incorporated by reference herein in its entirety. Additionally, the present application is related to U.S. application Ser. No. 09/874,979 filed on Jun. 7, 2001 (now U.S. Pat. No. 6,846,140), and U.S. application Ser. No. 10/109,051 filed on Mar. 29, 2002 (now U.S. Pat. No. 6,712,568) by Mark D. Snyder et al., which are incorporated by reference herein in their entirety.

BACKGROUND OF THE INVENTION

1. Field of the Invention

The present invention relates generally to fasteners for securing loads to a track, and more particularly, to adjustable fasteners for securing loads to a track mounted in or near a truck bed.

2. Background of the Invention

Fasteners for securing loads to framing, tracks, and channels have been commercially available for some time. Some conventional fasteners used in automotive track applications will be briefly described below.

Conventional track fasteners have been designed to be removable and/or relocateable along a track slot length. Many of these conventional track fasteners employ a rotatable locking base portion that engages locking teeth inside the track slot or on a locking mechanism to securely retain the fastener within the track slot, and to facilitate relocation along the track slot length. These devices, however, can be difficult to install and use, which detracts from their desirability in consumer environments such as original equipment manufactured (OEM) vehicles such as pickup trucks, mini-vans, sport-utility vehicles or other vehicles. Often, conventional track fasteners can only be loaded from an end of the track slot, because their design does not facilitate top down loading, and are thus difficult to replace if broken. Also problematic, many of these fasteners have limited load capacities, such as fasteners available on roof racks, and are thus unsuitable for applications such as truck beds and cargo areas where heavier loads are placed.

Other conventional track fasteners (e.g., U.S. Pat. Nos. 4,410,298, 4,784,552, and Re. 36,681, which are incorporated by reference herein in their entirety) have been designed with a center through bolt to apply pressure between a top plate mounted above the track slot and a base plate mounted within the track slot. The bolt can be tightened to clamp the fastener in place, thereby securely retaining the fastener within the track slot, or loosened to allow relocation along the track slot length. Clamp styled fasteners are often used to temporarily attach rails to the top side of a truck bed for tonneau covers and the like, and generally allow relocation along the length of the track slot. These devices, however, often require a user to have a wrench to loosen or tighten the bolt, which detracts from their ease of use.

Thus, a need exists for an improved track slot fastening device.

SUMMARY OF THE INVENTION

The present invention is directed to overcoming or at least reducing the effects of one or more of the problems set forth above and other problems in the prior art.

According to embodiments of the invention described below, there is provided a fastener assembly for securing loads to a track, the fastener assembly being retainable within a track slot of the track. The fastener assembly may include a retainer adapted to fit at least partly within a track slot and a handle operating on the retainer, the handle being moveable between at least an engagement position and a release position. A pressure applicator is positioned between the track and the handle, the pressure applicator having a bottom surface for applying a pressure on a top surface of the track in response to the position of the handle. The pressure applicator includes at least one projection projecting from the bottom surface and adapted to engage a positioning cutout of the track.

BRIEF DESCRIPTION OF THE DRAWINGS

The foregoing advantages and features of the invention will become apparent upon reference to the following detailed description and the accompanying drawings, of which.

DETAILED DESCRIPTION OF THE PREFERRED EMBODIMENTS

Reference will now be made in detail to presently preferred embodiments of the invention. Wherever possible, the same reference numbers will be used throughout the drawings to refer to the same or like parts.

The following description of the present invention will describe implementations of the present invention in reference to a track slot used in a truck bed. One such implementation is described in copending U.S. patent application Ser. No. 09/874,979 filed Jun. 7, 2001, by Michael D. Anderson et al., which is incorporated by reference herein in its entirety. Additional improvements and variations are described in the aforementioned corresponding related applications. Other implementations are also contemplated, as would be readily apparent to one of skill in the art after reading this disclosure.

It should be appreciated that the term track slot as used in the present specification refers to the entire internal volume of the track. Hence, track slot includes the space substantially between two upper inwardly protruding portions at the top of the track, and the volume underneath the protruding portions to a bottom surface of the track. It should also be appreciated that the term load as used in the present specification refers to a force applied to a fastener assembly by an object secured thereto. This load may include, for example, a horizontal force acting substantially along a plane of a vehicle body, a vertical force acting upwards and away from the aforementioned plane of the vehicle body, or a combination of the two.

A fastener assembly 1000 retainable within a track slot 605 of a track 600 according to a first embodiment of the present invention is shown in FIGS. 1 through 8. The fastener assembly 1000 includes a rotatable handle 1010, such as a thumb-wheel, which is shown best in FIGS. 5 and 6. The rotatable handle 1010 is disposed within an outer tie down 1011 for securing loads to the fastener assembly 1000. The rotatable handle 1010 is operably connected to a retainer 1050 by way of a shaft 1020. Retainer 1050 is configured to function in conjunction with a pressure plate 1040 to apply a mechanical clamping force on the track 600 when in an engaged or locked configuration.

Figure 1:
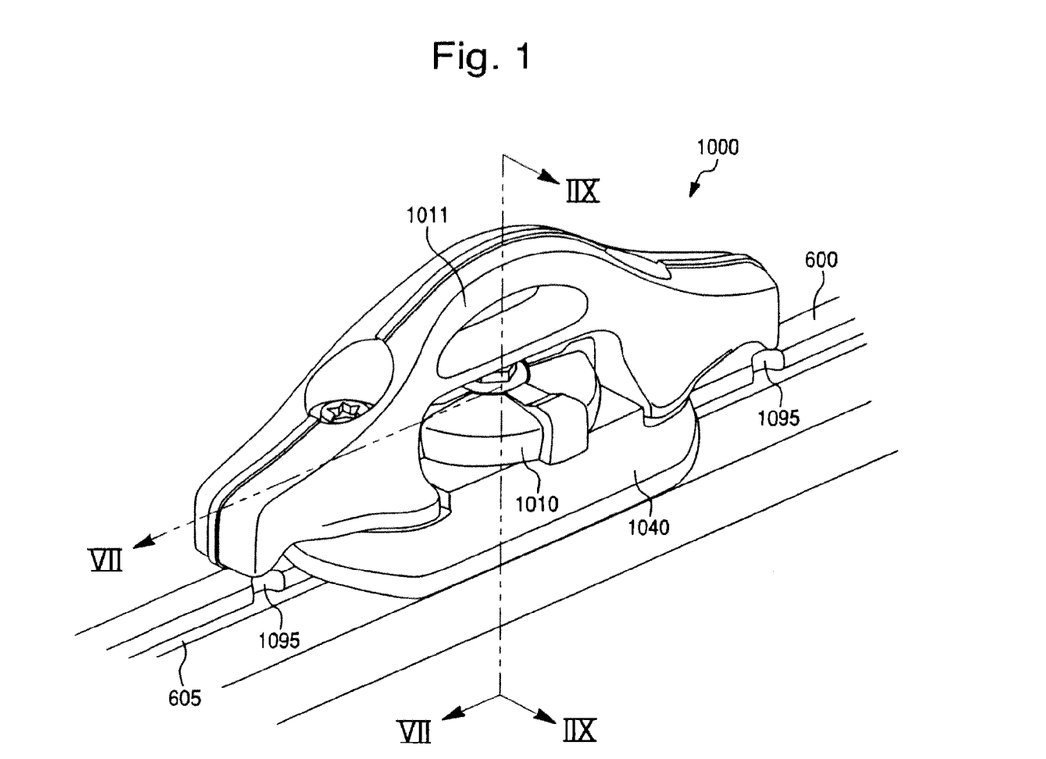
FIG. 1 is a perspective view of a fastener assembly according to an embodiment of the present invention.
Figure 2:
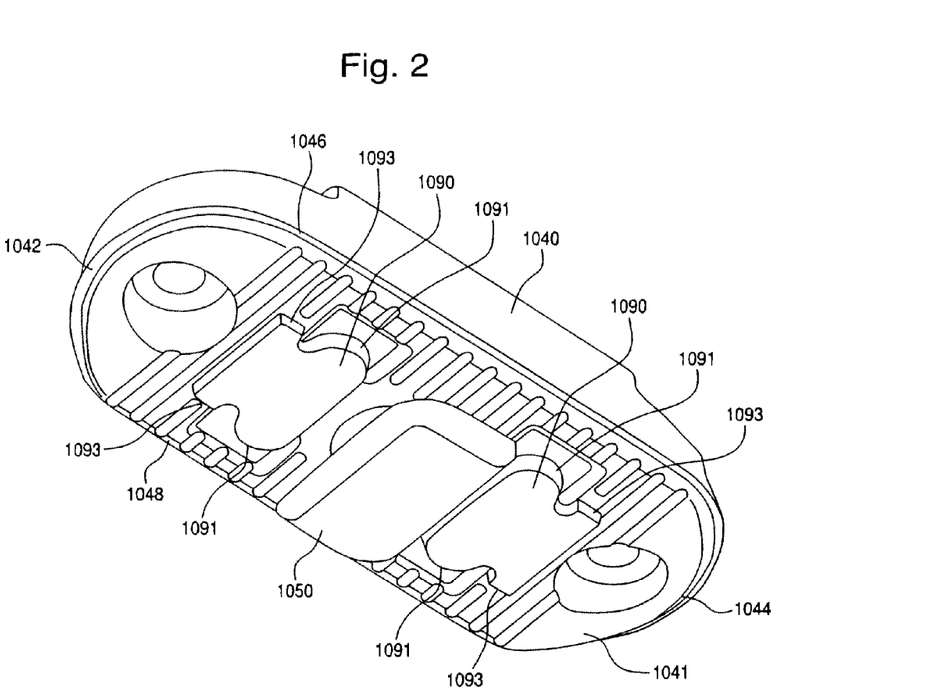
FIG. 2 is a bottom perspective view of the fastener assembly of FIG. 1.
Figure 3:
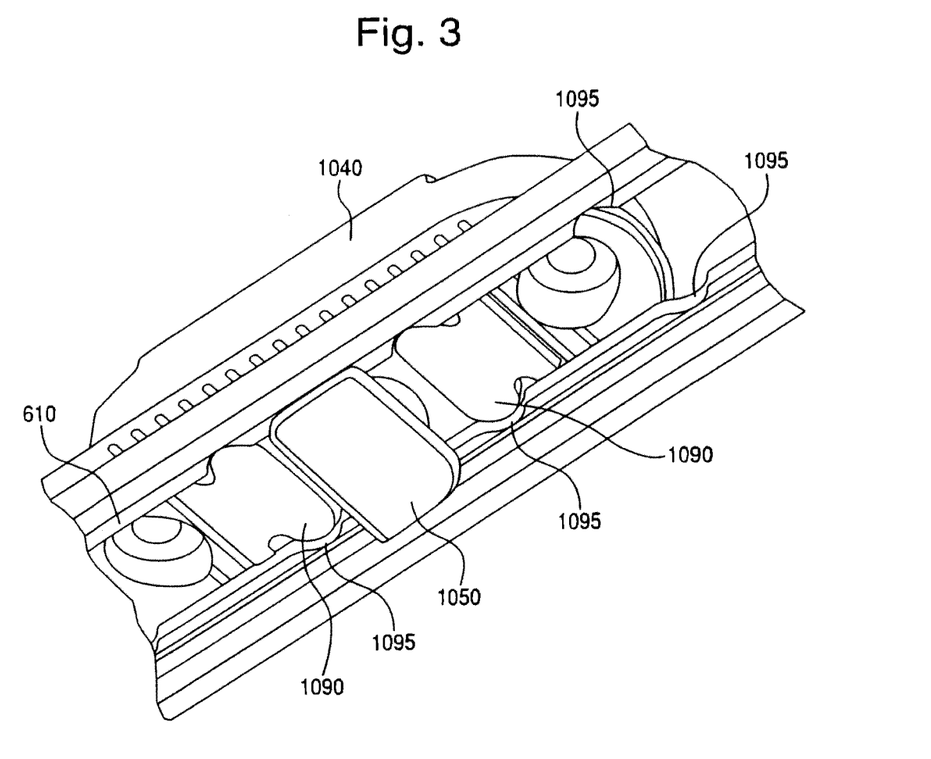
FIG. 3 is a bottom perspective view of the fastener assembly of FIG. 1 mounted on a track slot with the track slot cut in a mid-region to show an interface between the fastener assembly and the track slot.
Figure 4:
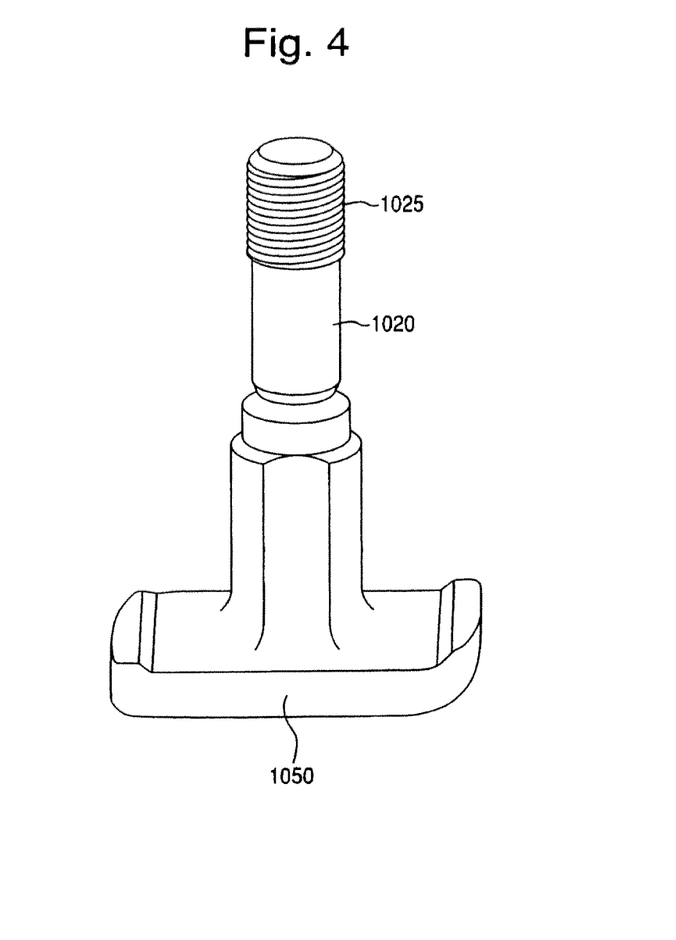
FIG. 4 is a perspective view of a shaft coupled to a retainer according to an embodiment of the present invention.
Figure 5:
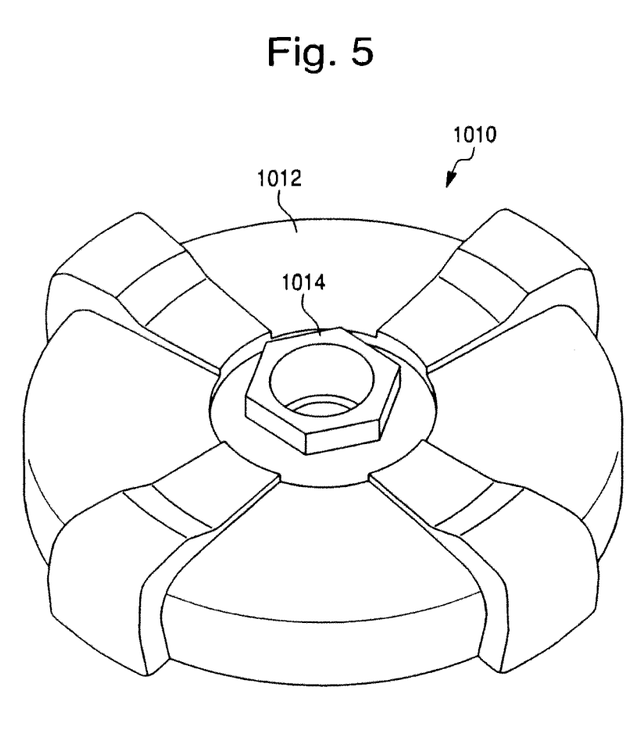
FIG. 5 is a top perspective view of a rotatable handle according to an embodiment of the present invention.
Figure 6:
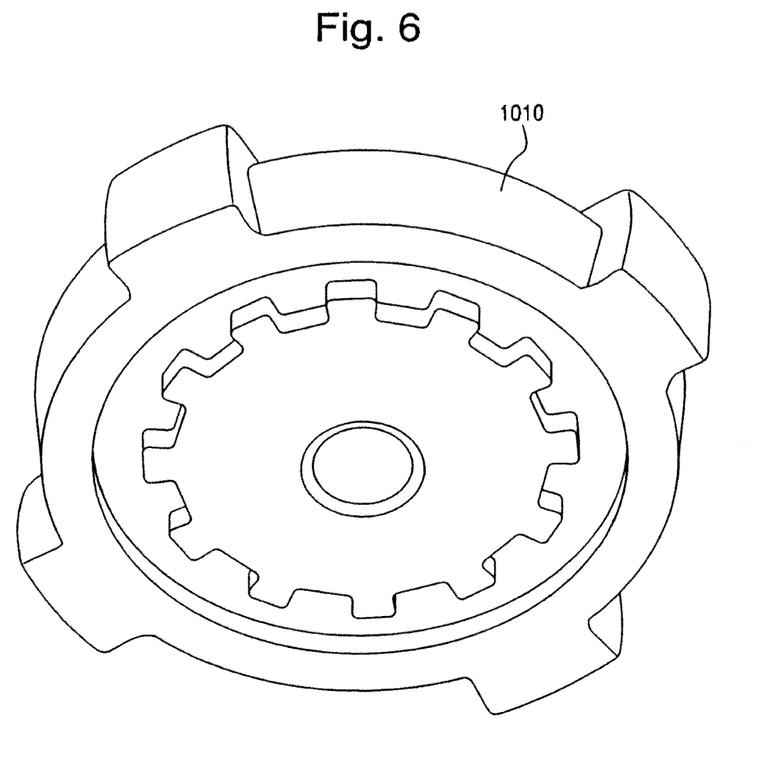
FIG. 6 is a bottom perspective view of the rotatable handle of FIG. 5.
Figure 7:
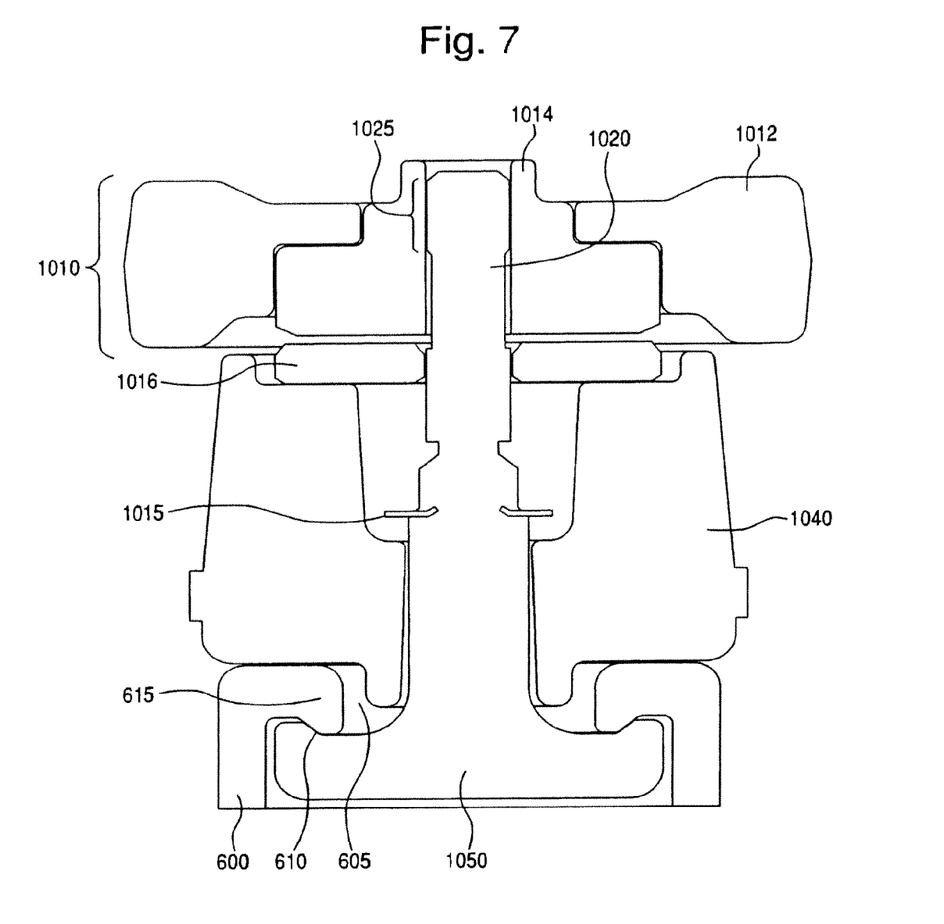
FIG. 7 is a sectional view of the fastener assembly of FIG. 1 viewed from plane VII-VII.

According to the first embodiment of the present invention as shown in FIG. 2, a plurality of projections 1090 are configured to extend from a bottom surface 1041 of pressure plate 1040. Preferably, the projections 1090 extend from a region located generally in the interior of the bottom surface 1041 of pressure plate 1040. In this configuration, the projections 1090 may be spaced from one or both of the ends 1042 and 1044 of pressure plate 1040 and from one or both of sides 1046 and 1048 of pressure plate 1040, or a plurality of combinations thereof. It can be appreciated that spacing the projections 1090 an approximately equal distance on opposite sides of shaft 1020 will ensure an equal load distribution across the bottom surface of the pressure plate 1040. Preferably, projections 1090 are positioned in a configuration shown in FIG. 2.

The projections 1090 may include four periphery portions 1091 formed in a shape conforming to that of scallops 1095 in track 600 to promote engagement therebetween and slot guide portions 1093 to further assist in positioning the fitting in the track. A clearance may also be provided to facilitate ingress and egress of the projections 1090. In the embodiment of the invention shown in FIGS. 1 to 8, the scallops are in the shape of a portion of a circle having a radius of about 5 mm (such as 5.37 mm) and thus each of the four periphery portions 1091 are in the shape of a portion of a circle having a radius of about 5 mm. In this particular embodiment, the non-scalloped portion of the top of the track slot is about 21 mm wide (such as 21.45 mm) and thus portions 1093 on each projection 1090 are spaced apart about 21 mm. In this particular embodiment, the centers of curvature of adjacent scallops are about 40 mm apart and thus the centers of curvature of the portions 1091 are about 40 mm apart. Other variations are also plausible, as will be readily apparent to one of ordinary skill in the art after reading this disclosure. For example, the scallops and periphery portions can have other arc-shaped geometries in addition to circular geometries. Projections 1090 are illustrated to project from pressure plate 1040 at an angle of 90° from the bottom surface 1041. However, it is contemplated that the projections 1090 may extend at a variety of angles to increase engagement with corresponding scallops 1095.

Figure 8:
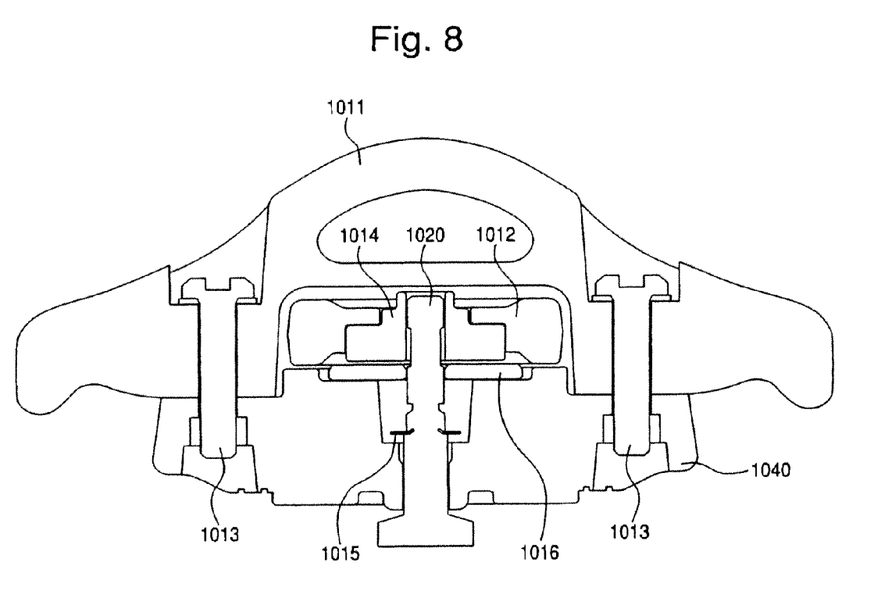
FIG. 8 is a sectional view of the fastener assembly of FIG. 1 viewed from plane IIX-IIX.

As shown in FIGS. 5 through 8, the rotatable handle 1010 may be formed of a multi-piece or multi-section construction. By way of example, the rotatable handle 1010 may include a top 1012 including a threaded nut 1014, for translating the threaded portion 1025 of shaft 1020, and a washer 1016 which prevents rotation and rocking of shaft 1020. This multi-piece or multi-section construction allows the rotatable handle 1010 to be easily assembled and manufactured. Also, shown in FIG. 8 are fasteners 1013, which hold the tie-down portion 1011 to pressure plate 1040 and a clip 1015 which retains the shaft 1020 to the rest of the fitting.

In order to insert the fastener assembly 1000 in track 600, the longitudinal axis of the fastener assembly 1000 is initially placed transverse to the longitudinal axis of the track 600. Next, the retainer 1050 is positioned such that the longer axis is oriented parallel to and above the slot. The retainer 1050 is then placed in the longitudinally extending slot 605 of the track 600. The fastener assembly 1000 is then rotated 90° in the clockwise or counterclockwise direction, thus aligning with track 600 so that the retainer 1050 is also rotated 90°. In this manner, the fastener assembly 1000 can be inserted in track 600 in a top-down method and easily secured to the track 600.

To secure fastener assembly 1000 to track 600, the fastener assembly 1000 is first inserted in the track 600, as described above. Next, the fastener assembly 1000 is placed along the track 600 such that projections 1090 engage corresponding scallops 1095 formed in the track 600. The rotatable handle 1010 is then rotated clockwise about a central axis defined by shaft 1020, which in turn rotates a central threaded portion 1014 of the rotatable handle 1010. Rotation of the rotatable handle 1010 operates to translate the threaded portion 1025 of shaft 1020, thereby translating shaft 1020 relative to rotatable handle 1010. As the shaft 1020 is translated the retainer 1050, which is coupled to the shaft 1020, contacts a lower surface 610 of a flange 615 formed on the track 600. The retainer 1050 and pressure plate 1040 combine to exert a clamping force on the track 600, thereby retaining the fastener assembly 1000 in a secured position on track 600. In this manner, the fastener assembly 1000 can be securely coupled to the track 600 in a plurality of locations along the track 600 for fastening loads thereto.

Figure 9:
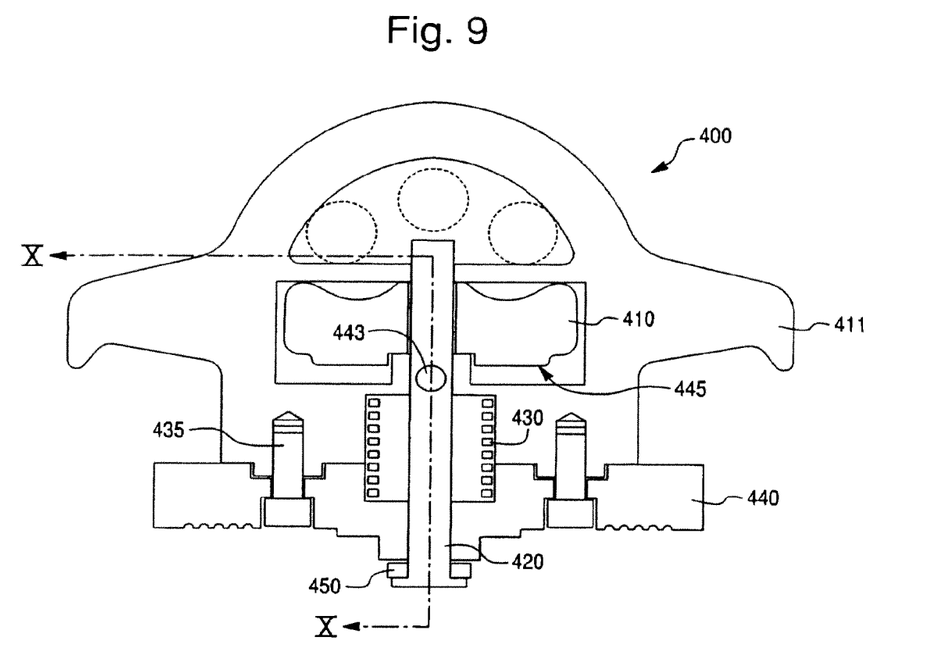
FIG. 9 is a sectional view of a fastener assembly with ramped or angled portions according to another embodiment of the present invention.
Figure 10:
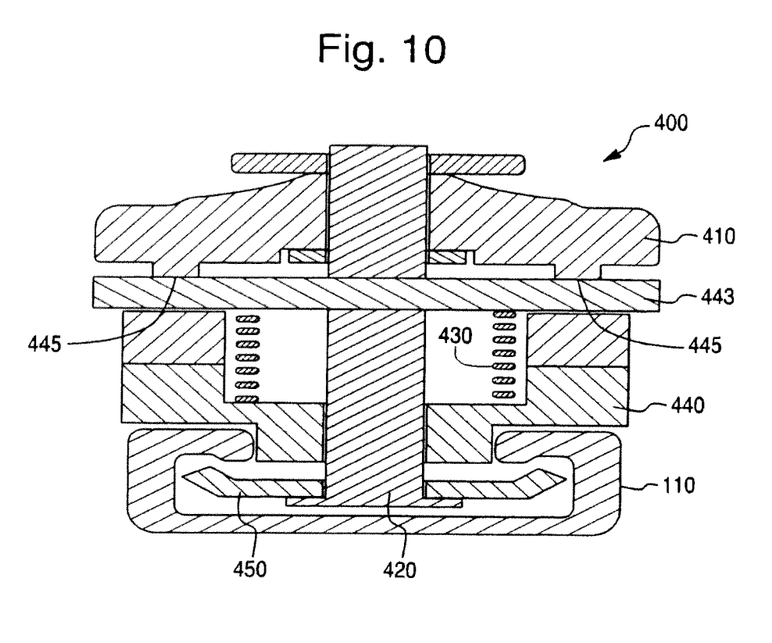
FIG. 10 is a partial sectional view of the fastener assembly of FIG. 9 viewed from plane X-X.

A fastener assembly 400 retainable within a track slot of a track 110 according to a second embodiment of the present invention is shown in FIGS. 9 and 10. A portion of FIG. 9 viewed from plane X-X is shown in greater detail in FIG. 10. The fastener assembly 400 according to this embodiment includes a rotatable handle 410, such as a thumb-wheel, within an outer tie down 411 for securing loads to the fastener assembly 400. The rotatable handle 410 operates retainer 450 via shaft 420. A spring 430 is provided in a space between the rotatable handle 410 and a pressure plate 440, such that the spring 430 applies a vertical force on a pin 443 with respect to the pressure plate 440. The pressure plate 440 is secured to the tie down 411 by screws 435.

To operate the fastener assembly 400, the rotatable handle 410 includes an angled running surface 445 interfacing pin 443. As the rotatable handle 410 is rotated between a locked position and a released position, the angled running surface 445 vertically displaces the pin 443 which is coupled to the retainer 450 by shaft 420. The rotatable handle 410 is limited in vertical displacement due to intersecting a portion of the outer tie down 411.

The interface between the angled running surface 445 and the pin 443 may be formed to prevent overtightening of the fastener assembly 400 and to default to a tightened condition during partial tightening of the rotatable handle 410. By way of example, the angled running surface 445 may include a notch (not shown) for receiving the pin 443 at a loosened state near the top of the angled running surface 445. If an operator only partially loosens the fastener assembly 400, thereby not engaging the notch, the spring 430 forces the pin 443 to slide down the angled running surface 445 into a tightened or engaged position. To prevent overtightening, the spring 430 is configured to apply the maximum retention force on the retainer 450 when the pin 443 is at the bottom of the angled running surface 445. Therefore, overtightening may be prevented and default engagement may be achieved by the present invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. For example, other types of retainers such as nuts or other fasteners may be used. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto, and their equivalents.

What is claimed is:

1. An arrangement for securing a load to a vehicle, comprising:
    a track having a track slot and opposed upper portions at least partly defining the track slot, the track comprising a series of evenly spaced cutouts in the upper portions; and
    a fitting including
        a main body;
        a handle being movable relative to the main body; and
        a retainer adapted to fit at least partly within the track, the retainer being movable relative to the main body between at least an engagement position and a release position by operating the handle;
        wherein the main body has a bottom surface for applying a pressure on a top surface of the track when the retainer is in the engagement position, the bottom surface lying in a plane that is substantially parallel to the top surface of the track when the retainer is in the engagement position, wherein the fitting includes at least one projection projecting from the bottom surface of the main body in a direction perpendicular to the top surface of the track when the retainer is in the engagement position, the projection having a portion shaped to mate with at least one cutout to assist in retaining the fitting at a desired location.

2. The arrangement of claim 1 wherein the handle is a rotatable handle.

3. The arrangement of claim 1, wherein the portion has a radius.

4. The arrangement of claim 3, wherein the radius of the portion of the projection is about 5 mm.

5. The arrangement of claim 1, wherein the projection projects from an interior portion of the bottom surface of the main body.

6. The arrangement of claim 1, wherein the main body includes a first end and a second end and a middle equidistant between the first end and the second end, and wherein the fitting includes at least two projections, at least one projection of the at least two projections is located between the first end and the middle and at least one other projection of the at least two projections is located between the second end and the middle.

7. The arrangement of claim 1, further comprising: a slot guide projecting from the bottom surface, the slot guide configured and arranged to position the fitting relative to the track slot of the track.

8. The arrangement of claim 4, wherein the fitting includes at least two projections each having a radius and wherein a center of curvature of the radius of a first projection of the at least two projections is approximately 40 mm apart from a center of curvature of the radius of a second projection of the at least two projections.

9. The arrangement of claim 1, wherein the retainer is T-shaped.

10. The arrangement of claim 1, wherein the fitting further comprises a tie-down connected to the main body.

11. The arrangement of claim 1, wherein when the retainer is in the engagement position, the retainer contacts the opposed upper portions from below, within the track slot.

12. The arrangement of claim 7, wherein the slot guide is contiguous with one of the at least one projection.

13. The arrangement of claim 1, wherein the series of evenly spaced cutouts are in edges of the upper portions.

14. The arrangement of claim 1, wherein the fitting comprises two projections each projecting from the main body and having a portion shaped to mate with at least one cutout to assist in retaining the fitting at a desired location.

15. The arrangement of claim 14, wherein the retainer is disposed between the two projections and equally spaced therefrom.

16. The arrangement of claim 1, wherein the retainer moves closer to the bottom surface of the main body when the retainer moves from the release position to the engagement position to clamp the opposed upper portions.

17. The arrangement of claim 1, wherein the track is positioned in a truck bed.

* * * * *